United States Patent
Dawson et al.

(10) Patent No.: US 11,655,546 B2
(45) Date of Patent: May 23, 2023

(54) ELECTROCHEMICAL HYDROGEN PRODUCTION UTILIZING AMMONIA

(71) Applicant: Utility Global, Inc., Houston, TX (US)

(72) Inventors: Matthew Dawson, Katy, TX (US); Nicholas Farandos, Bray (IE); Jason Dana, Woodlands, TX (US); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 0 days.

(21) Appl. No.: 17/556,508

(22) Filed: Dec. 20, 2021

(65) Prior Publication Data

US 2023/0109683 A1 Apr. 13, 2023

Related U.S. Application Data

(60) Provisional application No. 63/254,373, filed on Oct. 11, 2021.

(51) Int. Cl.
| | |
|---|---|
| *C25B 1/02* | (2006.01) |
| *C25B 9/19* | (2021.01) |
| *C25B 15/08* | (2006.01) |
| *C25B 9/65* | (2021.01) |
| *B01D 53/32* | (2006.01) |

(52) U.S. Cl.
CPC .............. *C25B 1/02* (2013.01); *B01D 53/326* (2013.01); *C25B 9/19* (2021.01); *C25B 9/65* (2021.01); *C25B 15/08* (2013.01)

(58) Field of Classification Search
CPC .............. C25B 1/02; C25B 1/04; C25B 1/044
See application file for complete search history.

(56) References Cited

U.S. PATENT DOCUMENTS

| | | |
|---|---|---|
| 3,635,812 A | 1/1972 | Spacil |
| 2003/0232224 A1 | 12/2003 | Kordesch et al. |
| 2004/0001994 A1 | 1/2004 | Marina et al. |
| 2006/0280998 A1 | 12/2006 | Ying et al. |
| 2007/0163889 A1* | 7/2007 | Kato .................. C25B 9/19 205/637 |
| 2009/0127094 A1 | 5/2009 | Botte |
| 2011/0177407 A1* | 7/2011 | Majima .............. H01M 8/2432 204/252 |
| 2015/0315713 A1 | 11/2015 | Weidner et al. |
| 2020/0255962 A1 | 8/2020 | Hall et al. |

(Continued)

OTHER PUBLICATIONS

Lewis et al "Effect of Co addition on the lattice parameter, electrical conductivity and sintering of gadolinia-doped ceria" Solid State Ionics, 152-153, 2002, p. 567-573. (Year: 2002).*

(Continued)

*Primary Examiner* — Brian W Cohen
(74) *Attorney, Agent, or Firm* — Foley & Lardner LLP

(57) ABSTRACT

Herein discussed is a method of producing hydrogen comprising: (a) providing an electrochemical reactor having an anode, a cathode, and a membrane between the anode and the cathode; (b) introducing a first stream to the anode, wherein the first stream comprises ammonia or a product from ammonia cracking; (c) introducing a second stream to the cathode, wherein the second stream comprises water; and wherein hydrogen is generated from water electrochemically without electricity input. Systems for producing hydrogen from ammonia are also discussed.

12 Claims, 3 Drawing Sheets

(56) References Cited

U.S. PATENT DOCUMENTS

2022/0093950 A1\* 3/2022 Goldstein .................. C25B 1/27

OTHER PUBLICATIONS

International Search Report and Written Opinion for PCT/US2021/064427 dated Jun. 30, 2022, 8 pages.
Modisha, Phillimon et al., 'Electrocatalytic Process for Ammonia Electrolysis: A Remediation Technique with Hydrogen Co-Generation', International Journal of Electrochemical science, 2016, vol. 11, pp. 6627-6635.

\* cited by examiner

ELECTROCHEMICAL HYDROGEN PRODUCTION UTILIZING AMMONIA

CROSS-REFERENCE TO RELATED APPLICATIONS

This application claims the benefit under 35 U.S.C. 119(e) of U.S. Provisional Patent Application No. 63/254,373 filed Oct. 11, 2021, the entire disclosure of which is hereby incorporated herein by reference.

TECHNICAL FIELD

This invention generally relates to hydrogen production. More specifically, this invention relates to electrochemical hydrogen production using ammonia.

BACKGROUND

Hydrogen in large quantities is needed in the petroleum and chemical industries. For example, large amounts of hydrogen are used in upgrading fossil fuels and in the production of methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy, which requires transportation of large quantities of hydrogen.

Ammonia has been identified as a suitable surrogate molecule for hydrogen transport as it is comparatively easy to contain and transmit compared to either pressurized or liquified hydrogen. However, ammonia by itself is not easily utilized and must be transformed to hydrogen. This transformation process unfortunately produces hydrogen mixed with nitrogen and these two gases are difficult to separate easily, efficiently, or economically. To be useful in conventional systems and processes, the hydrogen must be separated from the nitrogen.

Clearly there is increasing need and interest to develop new technological platforms to produce hydrogen. This disclosure discusses hydrogen production utilizing ammonia via efficient electrochemical pathways. The electrochemical reactor and the method to perform such reactions are discussed.

SUMMARY

Herein discussed is a method of producing hydrogen comprising: (a) providing an electrochemical reactor having an anode, a cathode, and a membrane between the anode and the cathode; (b) introducing a first stream to the anode, wherein the first stream comprises ammonia or a product from ammonia cracking; (c) introducing a second stream to the cathode, wherein the second stream comprises water, and wherein hydrogen is generated from water electrochemically without electricity input.

In an embodiment, the first stream and the second stream do not come in contact with one another. In an embodiment, the product from ammonia cracking consists essentially of hydrogen and nitrogen. In an embodiment, the product from ammonia cracking is sent directly to the anode without separation or purification. In an embodiment, ammonia cracking takes place in situ at the anode. In an embodiment, the second stream comprises hydrogen.

In an embodiment, the anode and the cathode are separated by the membrane and are both exposed to a reducing environment. In an embodiment, the anode comprises Ni or NiO and a material selected from the group consisting of YSZ, CGO, SDC, SSZ, LSGM. In an embodiment, the cathode comprises Ni or NiO and a material selected from the group consisting of YSZ, CGO, SDC, SSZ, LSGM, and combinations thereof.

In an embodiment, the membrane comprises gadolinium doped ceria, samarium doped ceria, a sintering aid, or combinations thereof. In an embodiment, the membrane comprises cobalt doped CGO (CoCGO). In an embodiment, the membrane consists essentially of CoCGO. In an embodiment, the reactor comprises no interconnect.

Also discussed herein is a hydrogen production system comprising an ammonia source or an ammonia cracker, a burner, and an electrochemical (EC) reactor comprising a mixed-conducting membrane, wherein the EC reactor is configured to receive a first stream from the ammonia source or ammonia cracker, wherein the EC reactor is configured to not receive or produce electricity. In an embodiment, the membrane conducts oxide ions and electrons, and wherein the reactor comprises no interconnect. In an embodiment, the membrane is impermeable to fluid flow.

In an embodiment, the first stream from the ammonia source or ammonia cracker is not separated or purified. In an embodiment, the EC reactor comprises an anode and a cathode separated by the membrane, and wherein the anode and the cathode are both exposed to a reducing environment. In an embodiment, the burner is configured to receive anode exhaust from the EC reactor and an oxidant. In an embodiment, the cathode is configured to receive steam and to generate hydrogen electrochemically. In an embodiment, the ammonia source or ammonia cracker is configured to receive exhaust from the burner.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
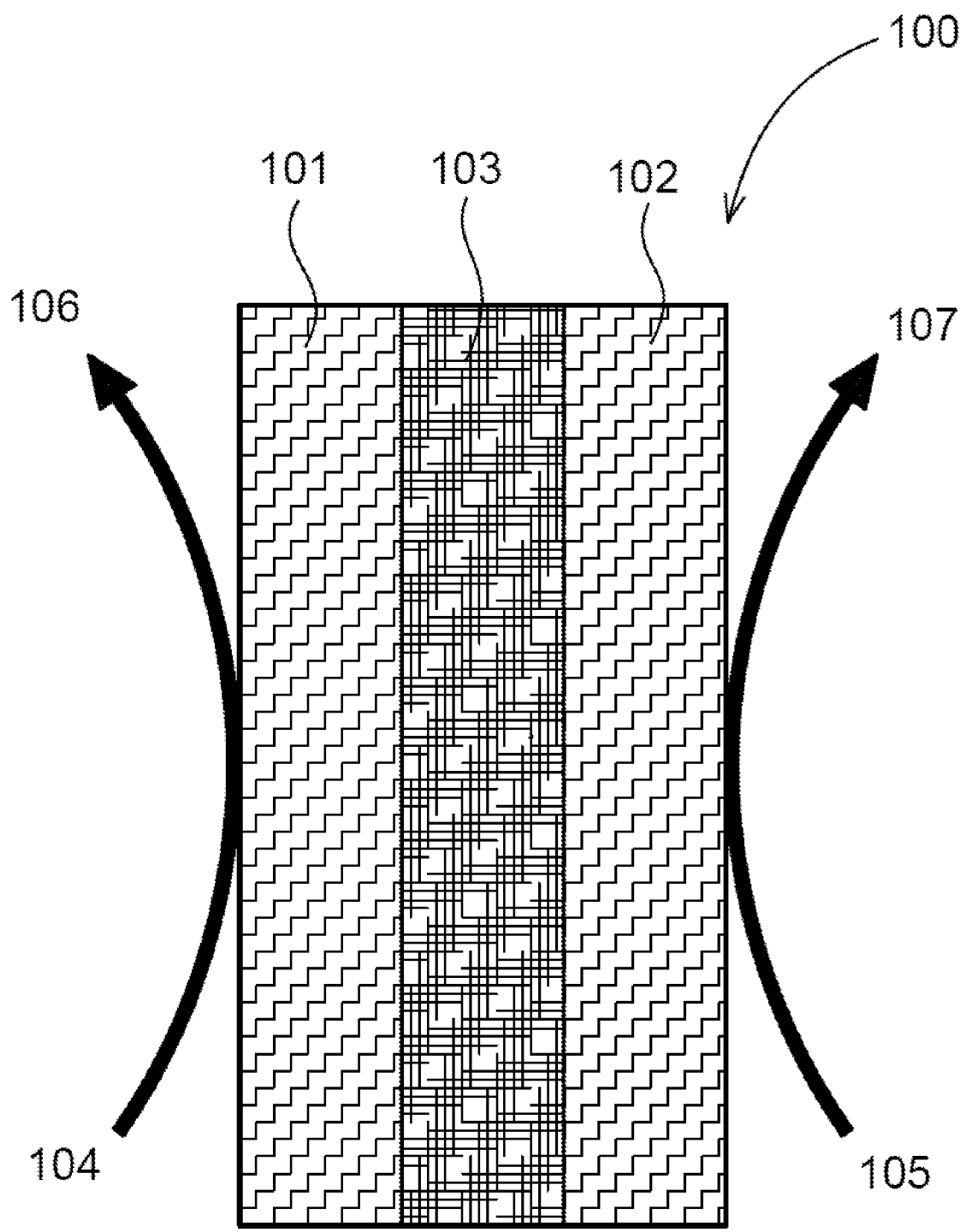
FIG. 1 illustrates an electrochemical (EC) reactor or an electrochemical gas producer, according to an embodiment of this disclosure.

Ammonia is an abundant and common chemical shipped around the globe. Furthermore, ammonia (unlike hydrogen) does not need to be stored under high pressure or cryogenically; and ammonia has ten times the energy density of a lithium-ion battery. As such, utilizing ammonia to produce hydrogen is very advantageous if it is done efficiently and economically. The disclosure herein discusses electrochemical systems and methods that are suitable for producing hydrogen using ammonia.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

As used herein, YSZ refers to yttria-stabilized zirconia; SDC refers to samaria-doped ceria; SSZ refers to scandia-stabilized zirconia; LSGM refers to lanthanum strontium gallate magnesite.

In this disclosure, no substantial amount of $H_2$ means that the volume content of the hydrogen is no greater than 5%, or no greater than 3%, or no greater than 2%, or no greater than 1%, or no greater than 0.5%, or no greater than 0.1%, or no greater than 0.05%.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd:CeO_2$). CGO and GDC are used interchangeably unless otherwise specified. Syngas (i.e., synthesis gas) in this disclosure refers to a mixture consisting primarily of hydrogen, carbon monoxide and carbon dioxide.

A mixed conducting membrane is able to transport both electrons and ions. Ionic conductivity includes ionic species such as oxygen ions (or oxide ions), protons, halogenide anions, chalcogenide anions. In various embodiment, the mixed conducting membrane of this disclosure comprises an electronically conducting phase and an ionically conducting phase.

In this disclosure, the axial cross section of the tubulars is shown to be circular, which is illustrative only and not limiting. The axial cross section of the tubulars is any suitable shape as known to one skilled in the art, such as square, square with rounded corners, rectangle, rectangle with rounded corners, triangle, hexagon, pentagon, oval, irregular shape, etc.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

The term "in situ" in this disclosure refers to the treatment (e.g., heating or cracking) process being performed either at the same location or in the same device. For example, ammonia cracking taking place in the electrochemical reactor at the anode is considered in situ.

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically conducting and ionically conducting circuits, respectively. This phenomenon is what distinguishes an electrochemical reaction from a chemical reaction.

Related to the electrochemical reactor and methods of use, various components of the reactor are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow.

Electrochemical Reactor

Contrary to conventional practice, an electrochemical reactor has been discovered, which comprises a mixed-conducting membrane, wherein the reactor is capable of producing hydrogen from water electrochemically without electricity input. The electrochemical reactions involve the exchange of oxide ions through the membrane to oxidize a fuel (e.g., carbon). The mixed-conducting membrane also conducts electrons to complete the electrochemical reactions. As such, the reactor comprises no interconnect or bipolar plate. Additionally, the reactor does not generate electricity and is not a fuel cell. In various embodiments, the electrodes have no current collector attached to them. In various embodiments, the reactor does not contain any current collector. Clearly, such a reactor is fundamentally different from any electrolysis device or any fuel cell.

FIG. 1 illustrates an electrochemical reactor or an electrochemical (EC) gas producer 100, according to an embodiment of this disclosure. Electrochemical reactor (or EC gas producer) device 100 comprises first electrode 101, membrane 103, and a second electrode 102. First electrode 101 (also referred to as anode) is configured to receive a fuel 104. Stream 104 contains no oxygen. In this disclosure, no oxygen means there is no oxygen present at first electrode 101 or at least not enough oxygen that it would interfere with the reaction. Second electrode 102 (also referred to as cathode) is configured to receive water (e.g., steam) as denoted by 105.

In an embodiment, device 100 is configured to receive a stream 104 containing a fuel (e.g., ammonia or an ammonia cracking product) and to generate $N_2$ and $H_2O$ (106) at the first electrode (101). In various embodiments, the fuel comprises $H_2$, CO, syngas, ammonia, or combinations thereof. In an embodiment, device 100 is also configured to receive water or steam (105) and to generate hydrogen (107) at the second electrode (102). In some cases, the second electrode receives a mixture of steam and hydrogen. Since water provides the oxide ion (which is transported through the membrane) needed to oxidize the fuel (e.g., $H_2$) at the opposite electrode, water is considered the oxidant in this scenario. As such, the first electrode 101 is performing oxidation reactions in a reducing environment, the second electrode 102 is performing reduction reactions in a reducing environment. In various embodiments, 103 represents an oxide ion conducting membrane. In an embodiment, the oxide ion conducting membrane 103 also conducts electrons. As such, the membrane is mixed-conducting.

In an embodiment, the first electrode 101 and the second electrode 102 comprise Ni—YSZ or NiO—YSZ. In various embodiments, electrodes 101 and 102 comprise Ni or NiO and a material selected from the group consisting of YSZ, CGO, SDC, SSZ, LSGM, and combinations thereof. Alternatively, gases containing a hydrocarbon are reformed before coming into contact with the membrane 103/electrode 101. The reformer is configured to perform steam reforming, dry reforming, or combination thereof. The reformed gases are suitable as feed stream 104.

In various embodiments, the device does not contain a current collector. In an embodiment, the device comprises no interconnect. There is no need for electricity and such a device is not an electrolyzer. This is a major advantage of the EC reactor of this disclosure. The membrane 103 is configured to conduct electrons and as such is mixed conducting, i.e., both electronically conductive and ionically conductive. In an embodiment, the membrane 103 conducts oxide ions and electrons. In an embodiment, the electrodes 101, 102 and the membrane 103 are tubular (see, e.g., FIGS. 2A and 2B). In an embodiment, the electrodes 101, 102 and the membrane 103 are planar. In these embodiments, the electrochemical reactions at the anode and the cathode are spontaneous without the need to apply potential/electricity to the reactor.

In an embodiment, the electrochemical reactor (or EC gas producer) is a device comprising a first electrode, a second electrode, and a membrane between the electrodes, wherein the first electrode and the second electrode comprise a metallic phase that does not contain a platinum group metal when the device is in use, and wherein the membrane is oxide ion conducting. In an embodiment, the first electrode is configured to receive a fuel. In an embodiment, said fuel comprises ammonia, or hydrogen, or carbon monoxide, or combinations thereof. In an embodiment, the second electrode is configured to receive water and hydrogen and configured to reduce the water to hydrogen. In various embodiments, such reduction takes place electrochemically without electricity input.

In an embodiment, the membrane comprises an electronically conducting phase containing doped lanthanum chromite or an electronically conductive metal or combination thereof; and wherein the membrane comprises an ionically conducting phase containing a material selected from the group consisting of gadolinium doped ceria (CGO), samarium doped ceria (SDC), yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, or combinations thereof.

In an embodiment, the membrane comprises gadolinium doped ceria, samarium doped ceria, a sintering aid, or combinations thereof. In various embodiments, the sintering aid comprises di-valent or tri-valent transition metal ions or combinations thereof. In an embodiment, the metal ions are oxides. In an embodiment, the transition metal comprises Co, Mn, Fe, Cu, or combinations thereof. In an embodiment, the membrane comprises CGO. In an embodiment, the membrane comprises cobalt doped CGO (CoCGO). In an embodiment, the membrane consists essentially of CGO. In an embodiment, the membrane consists of CGO. In an embodiment, the membrane consists essentially of CoCGO. In an embodiment, the membrane consists of CoCGO. In an embodiment, the reactor comprises no interconnect.

Figure 2A:
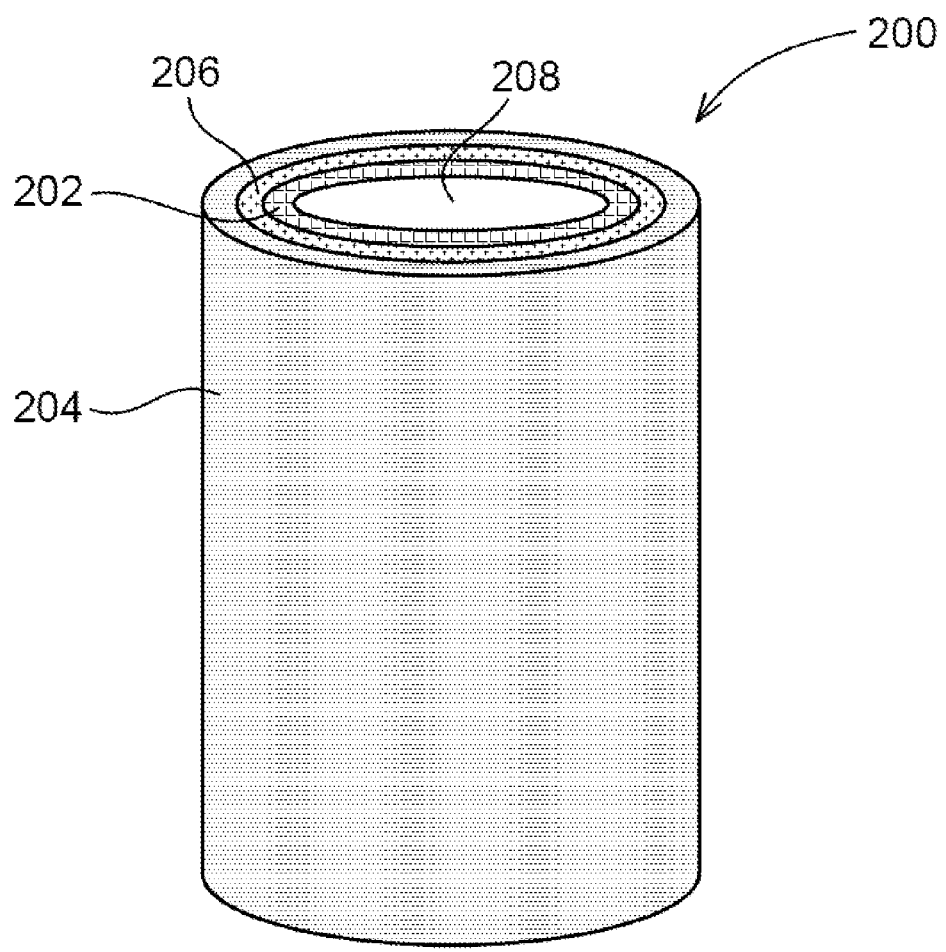
FIG. 2A illustrates a tubular electrochemical reactor, according to an embodiment of this disclosure.
Figure 2B:
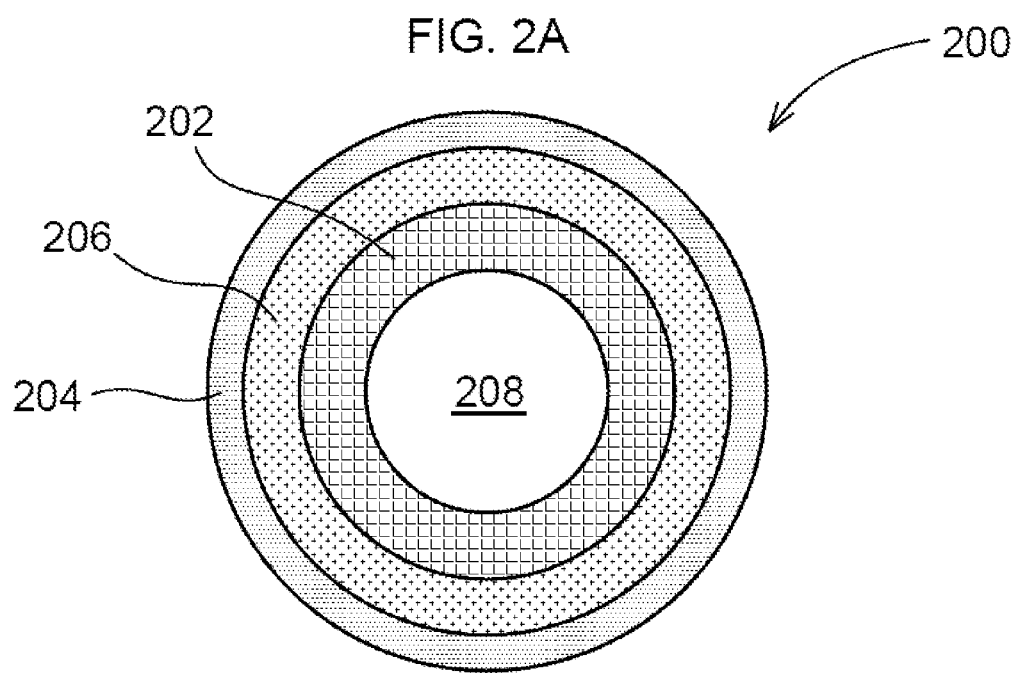
FIG. 2B illustrates a cross section of a tubular electrochemical reactor, according to an embodiment of this disclosure.

FIG. 2A illustrates (not to scale) a tubular electrochemical (EC) reactor or an EC gas producer 200, according to an embodiment of this disclosure. Tubular producer 200 includes an inner tubular structure 202, an outer tubular structure 204, and a membrane 206 disposed between the inner and outer tubular structures 202, 204, respectively. Tubular producer 200 further includes a void space 208 for fluid passage. FIG. 2B illustrates (not to scale) a cross section of a tubular producer 200, according to an embodiment of this disclosure. Tubular producer 200 includes a first inner tubular structure 202, a second outer tubular structure 204, and a membrane 206 between the inner and outer tubular structures 202, 204. Tubular producer 200 further includes a void space 208 for fluid passage.

In an embodiment, the electrodes and the membrane are tubular with the first electrode being outermost and the second electrode being innermost, wherein the second electrode is configured to receive water and hydrogen. In an embodiment, the electrodes and the membrane are tubular with the first electrode being innermost and the second electrode being outermost, wherein the second electrode is configured to receive water and hydrogen. In an embodiment, the electrodes and the membrane are tubular.

The EC reactor as discussed above is suitable to produce hydrogen from ammonia. A product from ammonia cracking comprises hydrogen and nitrogen and is sent to the anode of the EC reactor directly as the feed stream. In an embodiment, the reactor comprises porous electrodes that comprise metallic phase and ceramic phase, wherein the metallic phase is electronically conductive and wherein the ceramic phase is ionically conductive. In various embodiments, the electrodes have no current collector attached to them. In various embodiments, the reactor does not contain any current collector. Clearly, such a reactor is fundamentally different from any electrolysis device or fuel cell.

The electrochemical reactions taking place in the reactor comprise electrochemical half-cell reactions, wherein the half-cell reactions are:

In various embodiments, the half-cell reactions take place at triple phase boundaries, wherein the triple phase boundaries are the intersections of pores with the electronically conducting phase and the ionically conducting phase.

In various embodiments, the ammonia cracking product comprises hydrogen and nitrogen, wherein the hydrogen is a suitable fuel for the anode of the EC reactor. In various embodiments, the ammonia cracking product consists essentially of hydrogen and nitrogen. In various embodiments, the ammonia cracking product consists of hydrogen and nitrogen. An advantage of this method and system is that the presence of nitrogen in the anode feed stream does not affect the performance of the EC reactor or the production of hydrogen on the cathode side. Another advantage of this method and system is that no electricity is needed and therefore production of hydrogen from ammonia can be implemented in remote areas where there is no electricity supply.

In various embodiments, the ionically conducting membrane conducts oxide ions. In various embodiments, the ionically conducting membrane comprises solid oxide. In various embodiments, the ionically conducting membrane is impermeable to fluid flow. In various embodiments, the ionically conducting membrane also conducts electrons and wherein the reactor comprises no interconnect.

Hydrogen Production Using Ammonia

Figure 3:
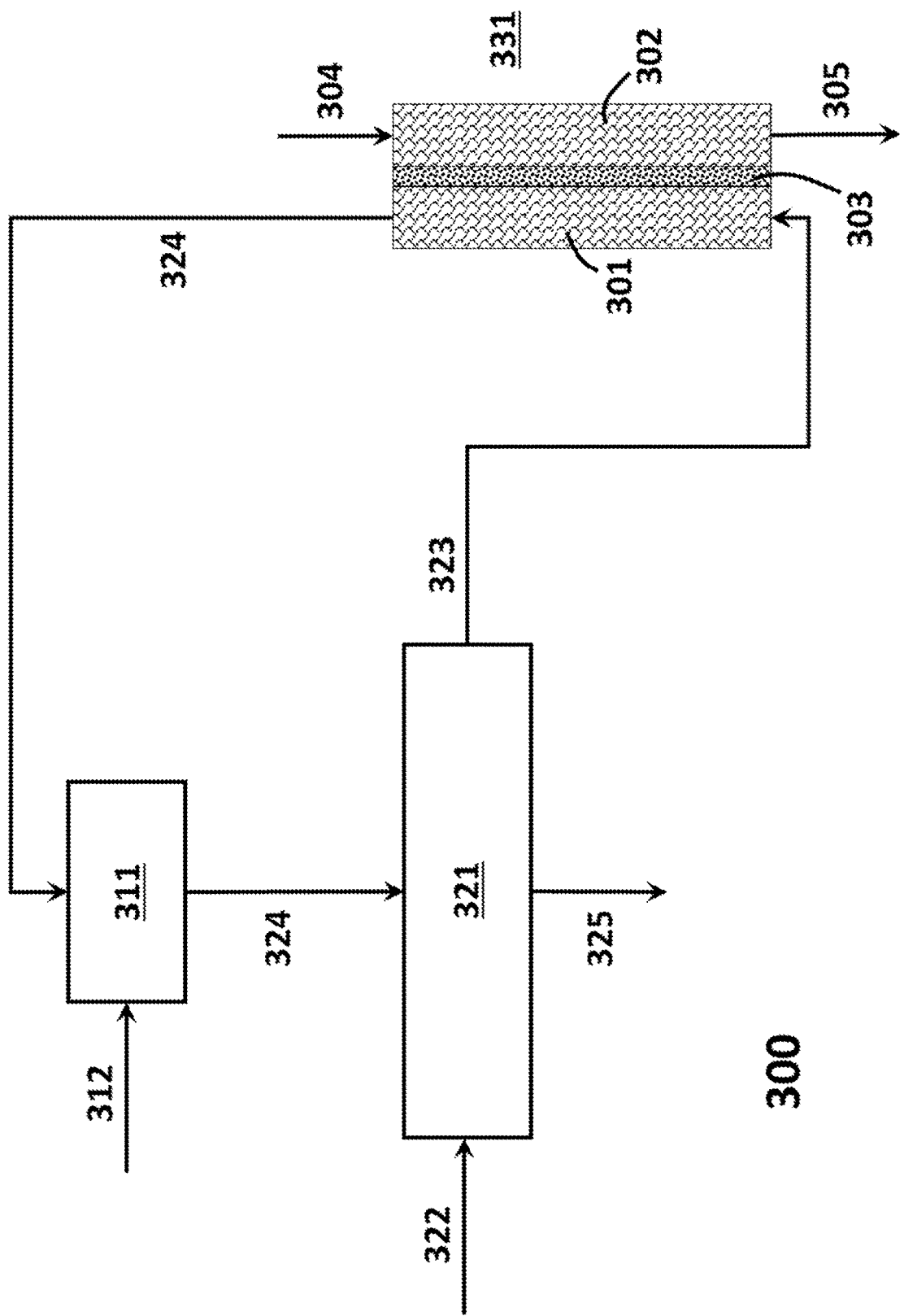
FIG. 3 illustrates a process of producing hydrogen electrochemically using ammonia, according to an embodiment of this disclosure.

As illustrated in FIG. 3, a hydrogen production system 300 utilizing ammonia is shown. System 300 comprises an EC reactor 331, an ammonia cracker 321, and a burner 311. The EC reactor comprises anode 301, cathode 302, and a membrane 303 between the anode and the cathode. In various embodiments, the membrane 303 is mixed conducting. An ammonia stream 322 is sent to the ammonia cracker 321 and a product stream 323 from the ammonia cracker is sent to the anode 301 of the EC reactor 331. The ammonia cracking product consists of nitrogen and hydrogen and is suitable for use in the anode without the need to separate the nitrogen from the hydrogen. This is a unique advantage of using the EC reactor of this disclosure. In various cases, further ammonia cracking takes place in situ at the anode 301 because nickel in the anode is a catalyst for ammonia cracking. Exhaust stream 324 from the anode 301 is sent to the burner 311. Burner 311 also receives an oxidant stream 312 (e.g., air or oxygen). At least a portion of the exhaust stream 324 from the burner 311 is sent to the ammonia cracker 321 to promote cracking of ammonia. For example, the ammonia cracker is configured as a heat exchanger such that stream 324 provides heat to crack ammonia and exits as stream 325. In various embodiments, the ammonia cracker 321 comprises a catalyst (e.g., nickel). The cathode of 302 of the EC reactor 331 is configured to receive water/steam 304 and to generate hydrogen (stream 305). Hydrogen is produced electrochemically by reducing water at the cathode. In some cases, stream 304 also comprises hydrogen.

Alternatively, ammonia cracker 321 is not needed. Ammonia stream 322 is sent directly to the anode 301, where ammonia cracking takes place in situ and the EC reactor is able to utilize ammonia to reduce water electrochemically to hydrogen at the cathode. This is a unique advantage of using the EC reactor of this disclosure (1) because ammonia cracking takes place in situ at the anode due to the presence of nickel in the anode and (2) because nitrogen does not affect the performance of the reactor and hydrogen is oxidized electrochemically at the anode via the oxide ions transported through the membrane, thus enabling the electrochemical reduction of water to hydrogen at the cathode. In a sense, the EC reactor of this disclosure is also an efficient separator such that the nitrogen on the fuel side (anode) does not mix with the hydrogen at the product side (cathode). Separation of hydrogen from water in the cathode exhaust is straightforward and inexpensive.

Herein discussed is a method of producing hydrogen comprising: (a) providing an electrochemical reactor having an anode, a cathode, and a membrane between the anode and the cathode; (b) introducing a first stream to the anode, wherein the first stream comprises ammonia or a product from ammonia cracking; (c) introducing a second stream to the cathode, wherein the second stream comprises water; and wherein hydrogen is generated from water electrochemically; wherein the first stream and the second stream do not come in contact with one another.

In an embodiment, the product from ammonia cracking consists of hydrogen and nitrogen. In an embodiment, the product from ammonia cracking is sent directly to the anode without separation or purification. In an embodiment, at least a portion of the anode exhaust gas is burned to provide heat for ammonia or the product from ammonia cracking. In an embodiment, ammonia cracking takes place in situ at the anode. In an embodiment, ammonia cracking takes place in a heat exchanger.

In an embodiment, the second stream comprises hydrogen. In an embodiment, the anode and the cathode are separated by the membrane and are both exposed to a reducing environment. In an embodiment, the anode comprises Ni or NiO and a material selected from the group consisting of YSZ, CGO, SDC, SSZ, LSGM, and wherein the cathode comprises Ni or NiO and a material selected from the group consisting of YSZ, CGO, SDC, SSZ, LSGM, and combinations thereof.

In an embodiment, the membrane comprises an electronically conducting phase containing doped lanthanum chromite or a metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, or combinations thereof.

In an embodiment, the membrane comprises gadolinium doped ceria, samarium doped ceria, a sintering aid, or combinations thereof. In various embodiments, the sintering aid comprises di-valent or tri-valent transition metal ions or combinations thereof. In an embodiment, the metal ions are oxides. In an embodiment, the transition metal comprises Co, Mn, Fe, Cu, or combinations thereof. In an embodiment, the membrane comprises CGO. In an embodiment, the membrane comprises cobalt doped CGO (CoCGO). In an embodiment, the membrane consists essentially of CGO. In an embodiment, the membrane consists of CGO. In an embodiment, the membrane consists essentially of CoCGO. In an embodiment, the membrane consists of CoCGO. In an embodiment, the reactor comprises no interconnect.

Also discussed herein is a hydrogen production system comprising an ammonia source or an ammonia cracker, a burner, and an electrochemical (EC) reactor comprising a mixed-conducting membrane, wherein the EC reactor is configured to receive a first stream from the ammonia source or ammonia cracker, wherein the first stream from the ammonia source or ammonia cracker is not separated or purified.

In an embodiment, the EC reactor comprises an anode and a cathode separated by the membrane and are both exposed to a reducing environment. In an embodiment, the membrane conducts electrons and wherein the reactor comprises no interconnect. In an embodiment, the membrane is impermeable to fluid flow.

In an embodiment, the membrane comprises an electronically conducting phase containing doped lanthanum chromite or a metal or combination thereof; and wherein the membrane comprises an ionically conducting phase containing a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia, and combinations thereof. In an embodiment, the doped lanthanum chromite comprises strontium doped lanthanum chromite, iron doped lanthanum chromite, strontium and iron doped lanthanum chromite, lanthanum calcium chromite, or combinations thereof; and wherein the conductive metal comprises Ni, Cu, Ag, Au, Pt, Rh, Co, or combinations thereof.

In an embodiment, the membrane comprises gadolinium doped ceria, samarium doped ceria, a sintering aid, or combinations thereof. In various embodiments, the sintering aid comprises di-valent or tri-valent transition metal ions or combinations thereof. In an embodiment, the metal ions are oxides. In an embodiment, the transition metal comprises Co, Mn, Fe, Cu, or combinations thereof. In an embodiment, the membrane comprises CGO. In an embodiment, the membrane comprises cobalt doped CGO (CoCGO). In an embodiment, the membrane consists essentially of CGO. In an embodiment, the membrane consists of CGO. In an embodiment, the membrane consists essentially of CoCGO. In an embodiment, the membrane consists of CoCGO.

In an embodiment, the burner is configured to receive anode exhaust from the EC reactor and an oxidant. In an embodiment, the cathode is configured to receive steam and to generate hydrogen. In an embodiment, the ammonia source or ammonia cracker is configured to receive exhaust from the burner. In an embodiment, the exhaust from the burner provides heat to ammonia or product from the ammonia cracker.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of producing hydrogen comprising: (a) providing an electrochemical reactor having an anode, a cathode, and a mixed-conducting membrane between the anode and the cathode; (b) introducing a first stream to the anode, wherein the first stream comprises ammonia or a direct product from ammonia cracking without separation or purification; (c) introducing a second stream to the cathode, wherein the second stream comprises water, and wherein hydrogen is generated from water electrochemically without electricity input or output.

2. The method of claim 1, wherein the first stream and the second stream do not come in contact with one another.

3. The method of claim 1, wherein the product from ammonia cracking consists essentially of hydrogen and nitrogen.

4. The method of claim 1, wherein ammonia cracking takes place in situ at the anode.

5. The method of claim 1, wherein the second stream comprises hydrogen.

6. The method of claim 1, wherein the anode and the cathode are separated by the membrane and are both exposed to a reducing environment.

7. The method of claim 1, wherein the anode comprises Ni or NiO and a material selected from the group consisting of YSZ, CGO, SDC, SSZ, LSGM, and wherein the cathode comprises Ni or NiO and a material selected from the group consisting of YSZ, CGO, SDC, SSZ, LSGM, and combinations thereof.

8. The method of claim 1, wherein the membrane comprises gadolinium doped ceria, samarium doped ceria, a sintering aid, or combinations thereof.

9. The method of claim 1, wherein the membrane comprises cobalt doped CGO (CoCGO).

10. The method of claim 1, wherein the membrane consists essentially of CoCGO.

11. The method of claim 1, wherein the reactor comprises no interconnect.

12. The method of claim 1, wherein the membrane conducts both oxide ions and electrons.

* * * * *